(12) United States Patent
Tawarayama et al.

(10) Patent No.: US 9,126,151 B2
(45) Date of Patent: Sep. 8, 2015

(54) SILICA-BASED HYDROGEN SEPARATION MATERIAL AND MANUFACTURING METHOD THEREFOR, AS WELL AS HYDROGEN SEPARATION MODULE AND HYDROGEN PRODUCTION APPARATUS HAVING THE SAME

(75) Inventors: Hiromasa Tawarayama, Yokohama (JP); Toru Adachi, Yokohama (JP); Toshiaki Kakii, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 214 days.

(21) Appl. No.: 13/515,230

(22) PCT Filed: Dec. 10, 2010

(86) PCT No.: PCT/JP2010/072201
§ 371 (c)(1),
(2), (4) Date: Oct. 9, 2012

(87) PCT Pub. No.: WO2011/071138
PCT Pub. Date: Jun. 16, 2011

(65) Prior Publication Data
US 2013/0022509 A1 Jan. 24, 2013

(30) Foreign Application Priority Data
Dec. 11, 2009 (JP) .................................. 2009-282210

(51) Int. Cl.
*B01D 71/02* (2006.01)
*B01D 67/00* (2006.01)
(Continued)

(52) U.S. Cl.
CPC .......... *B01D 71/024* (2013.01); *B01D 67/0039* (2013.01); *B01D 69/10* (2013.01);
(Continued)

(58) Field of Classification Search
CPC .. B01D 53/228; B01D 71/024; B01D 71/027; B01D 69/10; B01D 67/0039; B01D 2323/286; C01B 3/38; C01B 3/503

USPC .............. 96/4, 8, 10, 11; 95/45, 55, 139, 140; 423/648.1, 651; 422/162, 310; 427/397.7, 554, 535; 65/23, DIG. 9
See application file for complete search history.

(56) References Cited

U.S. PATENT DOCUMENTS 3,620,704 A * 11/1971 Gray .................................. 65/46
4,689,150 A *  8/1987 Abe et al. .......................... 96/11
(Continued)

FOREIGN PATENT DOCUMENTS

JP 61-204006 A 9/1986
JP 2001-137673 A 5/2001
(Continued)

OTHER PUBLICATIONS

Corning Inc., "VYCOR(R) Brand Porous Glass 7930", Product Brochure, 2001, 2 pages.*
(Continued)

Primary Examiner — Jason M Greene
(74) Attorney, Agent, or Firm — Ditthavong & Steiner, P.C.

(57) ABSTRACT

An object of the present invention is to provide a hydrogen separation material resistant to thermal shock, excellent in hydrogen separation characteristic and applicable to a hydrogen separation membrane, etc. and a manufacturing method thereof, as well as a hydrogen separation module and a hydrogen production apparatus comprising the same.
In the hydrogen separation material, a silica glass membrane is formed on a porous support having a linear expansion coefficient of $2 \times 10^{-6}$/K or less. The manufacturing method for the hydrogen separation material includes a porous support forming step of forming a porous support comprising porous silica glass and a silica glass membrane forming step of forming a silica glass membrane on the surface of the porous silica glass. The hydrogen separation module comprises the hydrogen separation material and a steam reforming catalyst. The hydrogen production apparatus comprises the hydrogen separation module.

3 Claims, 6 Drawing Sheets (51) Int. Cl.
*B01D 69/10* (2006.01)
*B01D 53/22* (2006.01)
*B01J 7/00* (2006.01)
*B05D 3/06* (2006.01)
*C01B 3/38* (2006.01)
*C01B 3/50* (2006.01)

(52) U.S. Cl.
CPC ............... *C01B 3/38* (2013.01); *C01B 3/503* (2013.01); *B01D 2325/22* (2013.01); *C01B 2203/0233* (2013.01); *C01B 2203/041* (2013.01); *C01B 2203/0405* (2013.01)

(56) References Cited

U.S. PATENT DOCUMENTS

| | | | |
|---|---|---|---|
| 6,527,833 B1* | 3/2003 | Oyama et al. | 95/55 |
| 2001/0000380 A1* | 4/2001 | Buxbaum | 95/55 |
| 2003/0205138 A1* | 11/2003 | Edlund et al. | 95/55 |
| 2009/0107330 A1* | 4/2009 | Gu | 95/55 |
| 2012/0325087 A1* | 12/2012 | Tsai et al. | 95/56 |

FOREIGN PATENT DOCUMENTS

| | | |
|---|---|---|
| JP | 2003-176140 A | 6/2003 |
| JP | 2004-149332 A | 5/2004 |
| WO | WO 02/45832 A1 | 6/2002 |
| WO | WO 2005/021141 A1 | 3/2005 |
| WO | 2009/121763 A1 | 10/2009 |

OTHER PUBLICATIONS

"Development of apparatus of a highly durable membrane type for impoving the quality of LP gas", pp. 47-54, with partial English Translation.

"Fine structures of the separation membrane and technique for controlling the chemical compositions", 2007, pp. 1-12, with partial English Translation.

Technique for preparing the membrane modules, Jul. 30, 2007, pp. 1-11, with partial English Translation.

Minute of the first meeting of the subcommittee for "Development of High-Efficiency and High Temperature Hydrogen Separation Membrane", 2007, pp. 1-16, with partial English Translation.

Summary of discussions at the first meeting of the subcommittee for "Development of High-Efficiency and High-Temperature Hydrogen Separation Membrane", 2007, pp. 1-7, with partial English Translation.

International Search Report for PCT Application No. PCT/JP2010/072201 dated Mar. 22, 2011, pp. 1-3.

Notification of the Second Office Action for corresponding Chinese Application No. 201080056142.X, dated Oct. 8, 2014, 14 pages.

English translation of Japanese Office Action corresponding to Japanese Patent Application No. 2011-545256, dated Jan. 6, 2015; 4 pages.

* cited by examiner

SILICA-BASED HYDROGEN SEPARATION MATERIAL AND MANUFACTURING METHOD THEREFOR, AS WELL AS HYDROGEN SEPARATION MODULE AND HYDROGEN PRODUCTION APPARATUS HAVING THE SAME

TECHNICAL FIELD

The present invention concerns a hydrogen separation material for separating hydrogen at high purity from a gas mixture containing hydrogen formed by fuel reforming, etc., as well as a hydrogen separation module and a hydrogen production apparatus having the same and, particularly, it relates to a hydrogen separation material in which a silica-based hydrogen permselective membrane for allowing hydrogen to permeable therethrough selectively is formed on the surface of a porous support and a manufacturing method therefor, as well as a hydrogen separation module and a hydrogen production apparatus having the same.

BACKGROUND ART

In the course of the progress for research and providing development of hydrogen production technique and infrastructure of utilizing hydrogen for realizing the hydrogen energy society, a great demand is expected in the feature for highly pure hydrogen used, for example, in automobile fuel cells, domestic stationary fuel cells, hydrogen stations, and large-scaled chemical plants in the feature, and higher efficiency is demanded for the production thereof.

For the production of hydrogen at present, a method of steam reforming a hydrocarbon fuel at a temperature of about 700° C. ($CH_4 + H_2O \rightarrow CO + 3H_2$) and then performing further CO-shifting at about several hundred ° C. ($CO + H_2O \rightarrow CO_2 + H_2$) has been utilized generally with a view point of price competitive power. Ingredients of a gas obtained by way of the reactions described above include, in addition to hydrogen, carbon dioxide, carbon monoxide and, further, unreacted hydrocarbons and water. In solid polymer fuel cells which have been started for popularized domestic use in recent years, purification of hydrogen is not performed for lowering the cost, but a gas mixture at a hydrogen concentration of about 60% is supplied as it is to a fuel electrode of a fuel cell, carbon monoxide that poisons the catalyst of the fuel electrode is oxidized into hydrogen dioxide ($CO + \frac{1}{2}O_2 \rightarrow CO_2$) before supply, and removed to a concentration of less than 10 ppm. However, since the fuel cell using the gas mixture has lower power generation efficiency compared with a fuel cell using pure hydrogen, a technique of producing hydrogen at a higher purity in a reduced space and at a low cost has been demanded. Further, in automobile fuel cells, it is necessary to supply hydrogen at 99.99% or higher in addition to the restriction for the CO concentration and a technique of mass producing inexpensive highly pure hydrogen is demanded.

A method of taking out highly pure hydrogen from a hydrogen containing gas mixture includes, for example, an absorption method, a cryogenic separation method, an adsorption method, and a membrane separation method in which the membrane separation method has an advantage that the efficiency is high and the size can be decreased easily. Further, by constituting a membrane reactor having a hydrogen separation membrane inserted therein in a reaction vessel for steam reforming, it is possible to continuously extract hydrogen generated by the reforming reaction from a reaction atmosphere, promote the reforming reaction and the CO shifting reaction simultaneously even at a temperature of about 500° C., thereby producing highly pure hydrogen at high efficiency. Further, in the membrane reactor, expensive noble metal catalysts such as platinum used for CO shifting are not necessary and it is possible to lower the cost and decrease the size of the apparatus. While the purity of a hydrogen gas passing through the hydrogen separation membrane depends on the performance of the hydrogen separation membrane, when it is necessary to further remove CO and improve purification depending on the application use, loads on such steps can be mitigated.

Several hydrogen separation membranes have been proposed under the background of the advantage in the hydrogen production using the hydrogen separation membrane as has been described above. For example, a non-patent document 1 describes a hydrogen separation membrane in which a palladium alloy membrane is supported on a zirconia porous substrate. In the hydrogen separation membrane, since hydrogen is separated by a method of dissolving hydrogen in the form of atoms into a palladium alloy and diffusing them along the concentration gradient thereby allowing only the pure hydrogen to permeate, highly pure hydrogen can be obtained in principle. A non-patent document 2 describes a hydrogen separation membrane in which a silica glass membrane is supported on an alumina-based porous substrate. The hydrogen separation membrane separates hydrogen by the function of a molecular sieve of selectively allowing hydrogen molecules to permeate by utilizing that the silica glass membrane has pores of a size for allowing only the hydrogen molecules to pass therethrough (0.3 nm).

CITATION LIST

Non Patent Literature

Non-Patent Literature 1: "Development of highly durable membrane type LP gas reforming apparatus", Heisei 20 Abstract for Fuel Cell•Hydrogen Technology Development Symposium, Independent Administrate Institution, New Energy and Industry Technology Development Mechanism Non-Patent Literature 2; "Development of highly efficient high temperature hydrogen separation membrane", (post fact evaluation) Sub-Committee Proceedings (July 30, Heisei 19), Independent Administrate Institution, New Energy and Industry Technology Development Mechanism.

SUMMARY OF INVENTION

Technical Problem

However, the palladium alloy membrane/zirconia porous support described in the non-patent document 1 involves a drawback that the mechanical strength is lowered by hydrogen embrittlement of the palladium alloy membrane due to long time use and the palladium alloy membrane is damaged by alloying with impurities such as sulfur and iron contained in the starting gas. Further, it is not suitable to mass production since palladium as the starting material is expensive and, in addition, the stable supply is not reliable. While the porous zirconia support is a material having high thermal shock resistance and small difference of a thermal expansion rate relative to the palladium alloy membrane among typical ceramics, the support has a drawback that it is damaged by abrupt temperature change or the palladium alloy membrane is peeled from the porous zirconia support. When water droplets are in contact with ceramics heated to several hundreds ° C., cracks are tended to be formed and, accordingly, the ceramic support cannot be used in a location where steams are condensed, particularly, in a case of using the ceramic support for the membrane reactor. Therefore, while it is necessary to airtightly bond the metal member for taking out hydrogen separated from the ceramic substrate to the outside of the membrane reactor at a high temperature heating portion, there exists a problem that a bonded portion is degraded thereby tending to cause seal leakage during long time use. In the silica glass membrane/porous alumina support described in the non-patent document 2, while the damage caused by the degradation of the silica glass membrane is overcome, since alumina is less resistant to thermal shock than zirconia and also has a large difference of the thermal expansion rate relative to the silica glass, this tends to result a problem of suffering from damage due to the abrupt temperature change or peeling of the silica glass membrane from the support as described above.

The present invention has been achieved in view of the foregoing subjects in the existent hydrogen separation membrane and the object thereof is to provide a hydrogen separation material resistant to thermal shock, having good adhesion between the membrane and the support, excellent in the hydrogen separation characteristic, and applicable to a hydrogen separation membrane, etc. and a manufacturing method therefor, as well as a hydrogen separation module and a hydrogen production apparatus having the same.

Solution to Problem

The present inventors have made earnest studies for attaining the foregoing object and, as a result, have found that a hydrogen separation material resistant to thermal shock and excellent in the hydrogen separation characteristic can be obtained by using a silica glass membrane as the membrane and defining the linear thermal expansion coefficient of a support in a hydrogen separation material comprising the membrane and the support therefor, and a manufacturing method including a porous support forming step of forming a porous support comprising porous silica glass and a silica glass membrane forming step of forming a silica glass membrane on the surface of the porous silica glass, and have accomplished the present invention based on the finding.

That is, the hydrogen separation material and the manufacturing method therefor, as well as the hydrogen separation module and the hydrogen production apparatus having the same according to the invention are as described below.

(1) A hydrogen separation material of the invention is characterized in that a silica glass membrane is formed on a porous support having a linear thermal expansion coefficient of $2\times10^{-6}$/K or less.

(2) A preferred embodiment of the hydrogen separation material of the invention is characterized in that the porous support comprises porous silica glass.

(3) Another preferred embodiment of the hydrogen separation material of the invention is characterized in that the shape is tubular.

(4) Further, a preferred embodiment of the hydrogen separation material of the invention is characterized in that at least one of elements selected from rare earth elements, group 4B elements, Al and Ga is added to the porous silica glass and/or silica glass membrane.

(5) A further preferred embodiment of the hydrogen separation material of the present invention is characterized in that the porous silica glass is densified by surface modification thereby forming the silica glass membrane on a porous support comprising (6) A further preferred embodiment of the hydrogen separation material of the invention is characterized in that the surface modification is a processing of irradiating at least one means selected from a $CO_2$ laser, a plasma arc, and a oxyhydrogen flame thereby densifying the surface of the porous silica glass.

(7) A manufacturing method for the hydrogen separation material according to the invention is characterized by including a porous support forming step of forming a porous support comprising porous silica glass and a silica glass membrane forming step of forming a silica glass membrane on the surface of the porous silica glass.

(8) Further, a preferred embodiment of the manufacturing method for the hydrogen separation material according to the invention is characterized in that the porous support forming step is a step of depositing porous silica glass at the periphery of a dummy rod and then drawing out the dummy load to form a tubular porous support comprising the porous silica glass.

(9) Further, another preferred embodiment of the manufacturing method for the hydrogen separation material according to the invention is characterized in that the porous support forming step is a step of depositing porous silica glass with addition of at least one elements selected from rare earth element, group 4B elements, Al, and Ga to the periphery of a dummy rod and then drawing out the dummy rod thereby forming a tubular porous support comprising porous silica glass.

(10) A manufacturing method for a hydrogen separation material according to the invention is characterized by including a porous support forming step of forming a porous support comprising the porous silica glass, and a silica glass membrane forming step of densifying the surface of the porous silica glass thereby forming a dense silica glass membrane.

(11) A further preferred embodiment of the manufacturing method for the hydrogen separation material according to the invention is characterized in that the silica glass membrane forming step is a step of irradiating at least one means selected from a $CO_2$ laser, a plasma arc, and an oxyhydrogen burner thereby densifying the surface of the porous silica glass.

(12) A further hydrogen separation material according to the invention is characterized in that it is obtained by any one of the manufacturing methods for the hydrogen separation material according to the invention described above.

(13) A further preferred embodiment of the hydrogen separation material according to the invention is characterized in that the porosity of the porous support is from 20 to 70%.

(14) A further preferred embodiment of the hydrogen separation material according to the invention is characterized in that the thickness of the porous support is from 0.2 to 5 mm.

(15) A further preferred embodiment of the hydrogen separation material according to the invention is characterized in that the thickness of the silica glass is from 0.01 to 50 μm.

(16) A hydrogen separation module according to the invention is characterized by including one of the hydrogen separation materials of the invention described above and a steam reforming catalyst, (17) A hydrogen production apparatus according to the invention is characterized by including the hydrogen separation module of the invention described above.

(18) Another hydrogen production apparatus according to the invention is characterized by including the hydrogen separation module of the invention described above and a CO removing module.

(19) Further, a preferred embodiment of the hydrogen production apparatus according to the invention is characterized in that the Co removing module has a CO methanation catalyst.

(20) A preferred embodiment of the hydrogen production apparatus according to the invention is characterized by including a hydrogen purification module to which the hydrogen separation module of the invention described above and a pressure swing adsorption (PAS) method are applied.

Advantageous Effects of Invention

According to the invention, it is possible to provide a hydrogen separation material resistant to thermal shock, having good adhesion between the membrane and support, excellent in the hydrogen separation characteristic, and applicable to a hydrogen separation membrane, etc., and a manufacturing method therefor, as well as a hydrogen separation module and a hydrogen production apparatus having the same.

DESCRIPTION OF EMBODIMENTS

A hydrogen separation material and a manufacturing method therefor, as well as a hydrogen separation module and a hydrogen production apparatus having the same according to the invention are to be described specifically with reference to the drawings.

(Hydrogen Separation Material)

Figure 1:
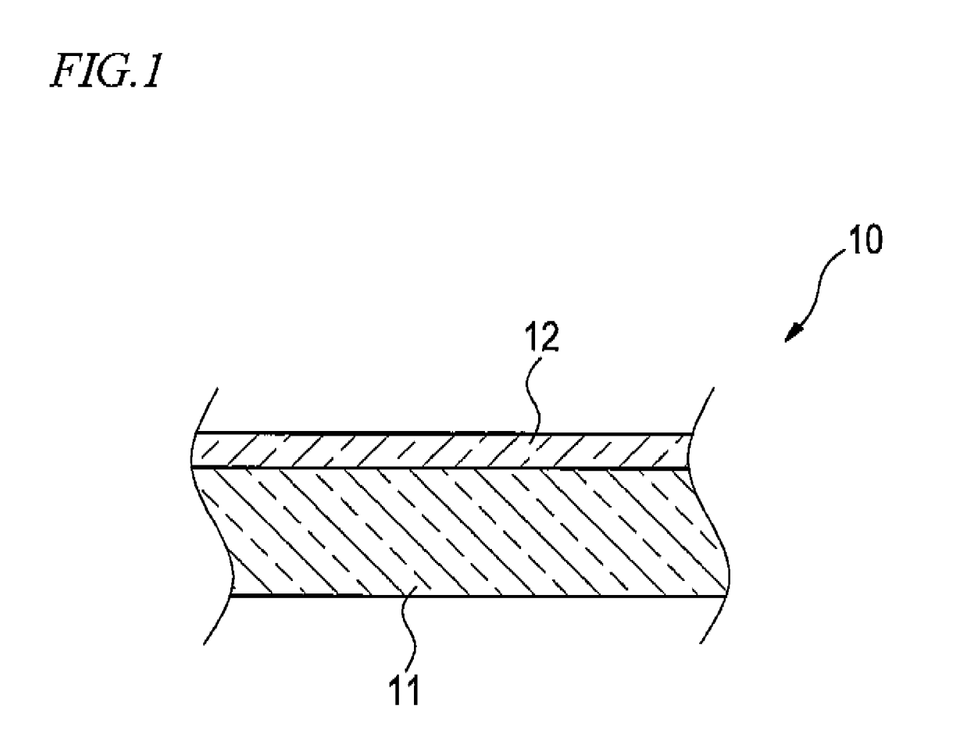
FIG. 1 is a partial cross sectional view showing an embodiment of a hydrogen separation material according to the invention.

FIG. 1 is a partial cross sectional view showing an example of a hydrogen separation material according to the invention. In hydrogen separation material 10, a silica glass membrane 12 is formed on a porous support 11 having a linear thermal expansion coefficient of $2\times10^{-6}$/K or less.

In the invention, the silica glass membrane 12 is used as a hydrogen permeation membrane as described above thereby suppressing degradation of the membrane caused by hydrogen embrittlement and reaction with impurities in the starting material. While the thickness of the silica glass membrane 12 is not particularly restricted, it is preferably from 0.01 to 50 μm, more preferably, from 0.02 to 10 μm and, further preferably, 0.03 to 5 μm. In a case where it is less than 0.01 μm, the hydrogen purity of the permeating gas is excessively low and, in a case where it exceeds 50 μm, the hydrogen permeation rate is excessively low sometimes making it difficult to obtain a sufficient hydrogen separation performance in view of practical use.

Referring to the support for the silica glass membrane 12, when the porous support 11 is used, the thin membrane can be supported with no interference to the hydrogen permeation in the silica glass membrane 12. While the porosity of the porous support 11 is not particularly restricted, it is preferably from 20 to 70% in view of the balance between the mechanical strength and the gas permeability. "Porosity" can be calculated as a ratio of an air volume occupying per unit volume.

Further, the linear thermal expansion coefficient of the porous support 11 is $2\times10^{-6}$/K or less as described above. In a case where it exceeds $2\times10^{-6}$/K, generated thermal stress increases and no desired thermal shock resistance can be obtained. While the material of the porous support 11 is not particularly restricted so long as it has a defined linear thermal expansion coefficient, those having a linear thermal expansion coefficient approximate to that of the silica glass membrane 12 are preferred with a view point of the thermal impact resistance.

While the thickness of the porous support 11 is not particularly restricted, it is preferably from 0.2 to 5 mm, more preferably, from 0.5 to 3 mm and, further preferably, from 0.2 to 5 mm in view of the balance between the mechanical strength and the gas permeability.

While the shape of the hydrogen separation material 10 of the invention is not particularly restricted but may be in any optional shape, for example, a planar shape. it is preferably tubular for increasing the area of contact with a hydrogen containing gas mixture in view of the reaction efficiency.

Figure 2:
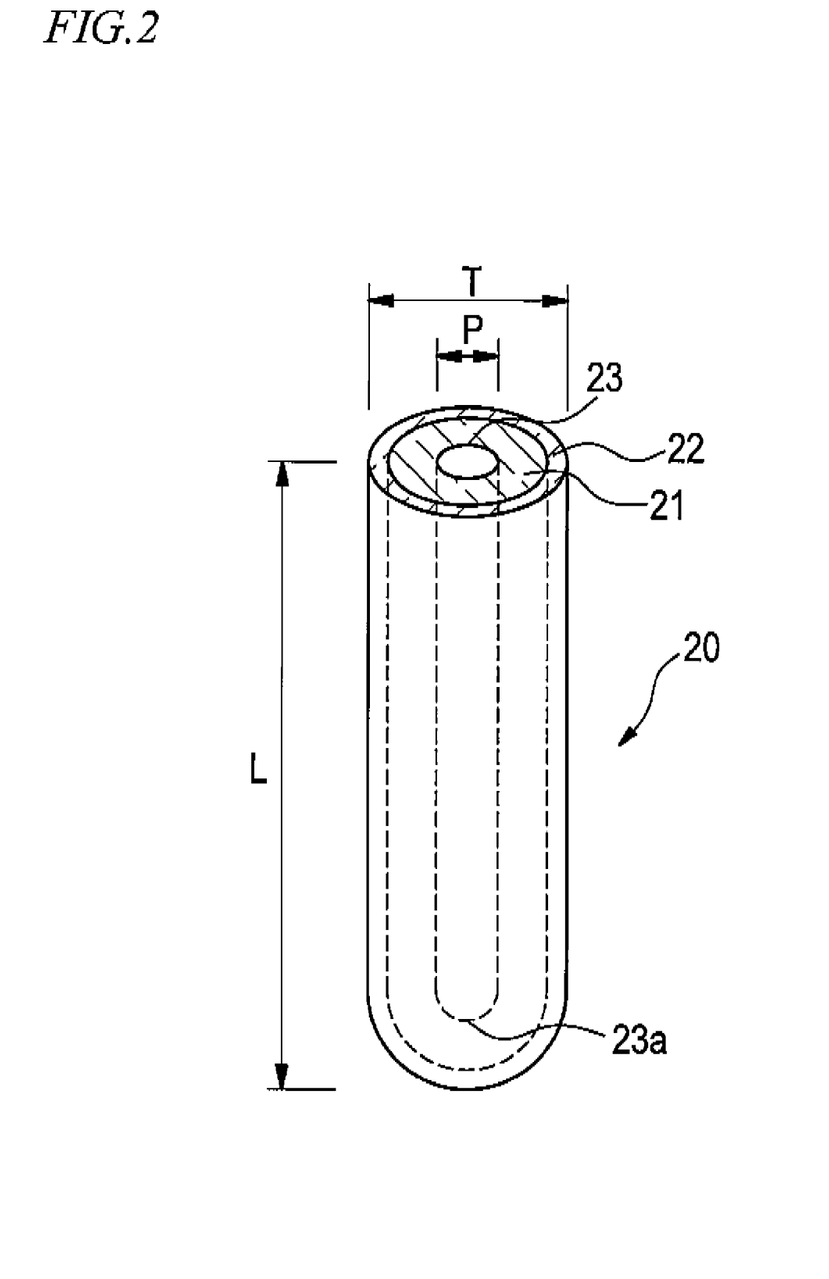
FIG. 2 is a schematic view showing an embodiment of a hydrogen separation material according to the invention.

FIG. 2 shows an example of a tubular hydrogen separation material 20. The hydrogen separation material 20 is substantially in a cylindrical shape and has a central hole 23 in the center substantially of a circular cross section extending in the longitudinal direction. The hydrogen separation material 20 comprises a porous support 21 as a tube wall and a silica glass membrane 22 in this order in the outer circumference of the central hole 23. It has an outer diameter T of 2 mm to 50 mm, an inner diameter (diameter for the central hole 23) P of 1.6 mm to 48 mm, and a length L of about 200 mm to 400 mm. The central hole 23 is preferably closed at one end 23a. Further, for enlarging the surface area of the tube, the outer diameter T and the inner diameter P may be changed periodically in the longitudinal direction and the thickness can also be changed partially for reinforcing the mechanical strength.

As described above, the porous support 11 is preferably selected from those having a linear thermal expansion coefficient approximate to that of the silica glass membrane 12 in a view of the thermal shock resistance. In the hydrogen separation material 10 of the invention, the material for the porous support 11 preferably comprises porous silica glass, in which an element from rare earth elements, group 4B elements, Al, and Ga, or two or more of them in combination can be added to one or both of the silica glass membrane 12 and the porous silica glass constituting the porous support 11. This is because desired mechanical properties and steam resistance can be obtained by adjusting the ingredients of the porous silica glass constituting the porous support 11 or the silica glass membrane 12.

For example, in a case of using the hydrogen separation material 10 of the invention for steam reforming of a hydrocarbon fuel, since it is inevitably in contact with steams at 500° C. or higher, it is preferred to introduce other ingredients thereby improving the steam resistant performance.

Further, the porous silica glass constituting the porous support 11 can be manufactured by a manufacturing method such as a sooting method (CVD method) and an injection molding method. Also for the silica glass membrane 12, the forming method is not particularly restricted and means for forming the membrane by surface modification of the porous silica glass constituting the porous support 11 can be used in addition to the sol-gel method or the CVD method. "Surface modification" means that the porous silica glass constituting the porous support 11 is densified to some extent at a portion to form the surface membrane, for example, near the surface of the porous silica glass constituting the porous support 11 into a dense silica glass layer for preparing a hydrogen permeation membrane portion. One of the methods includes a heating method. Specifically, this is a method of irradiating, for example, a $CO_2$ laser, a plasma arc, and an oxyhydrogen flame alone or in combination of plurality of them.

As described above, while the silica glass film 12 can be manufactured also by the sol-gel method or the CVD method, the forming method by the surface modification can increase the bonding strength between the membrane and the support compared with the manufacturing method of manufacturing the porous silica glass and the silica glass membrane constituting the porous support 11 separately and laminating them and the thickness or the size of pores of the silica glass membrane 12 can be controlled simply depending on the extent of the densification. The extent for the densification of the silica glass membrane 12 can be set in view of the molecular size of a gas to be separated. With a view point of the hydrogen permeation, it is preferred that the silica glass membrane 12 is densified such that the hole diameter is about 0.3 nm in view of the hydrogen permeation.

Further, another hydrogen separation material of the invention is obtained by the following manufacturing method.

(Manufacturing Method for Hydrogen Separation Material)

The manufacturing method for the hydrogen separation material of the invention includes (1) a porous support forming step of forming a porous support comprising porous silica glass, and (2) a silica glass membrane forming step of forming a silica glass membrane on the surface of the porous silica glass. The manufacturing method for the hydrogen separation material according to the invention is to be described with reference to the drawings.

(1) Porous Support Forming Step

The method of manufacturing a porous silica glass is not particularly restricted and includes, for example, a sooting method (CVD method) and injection molding method.

Figure 3A:
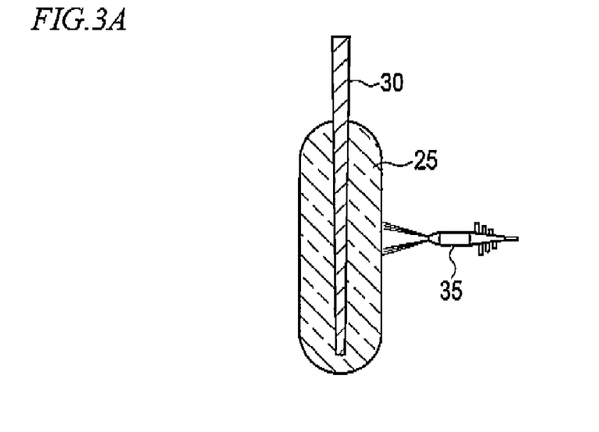
FIGS. 3A, 3B, and 3C is a view for explaining a deposition step (a), a drawing out step (b), and a silica glass membrane forming step (c) as an embodiment of a manufacturing method for a hydrogen separation material according to the invention.
Figure 3B:
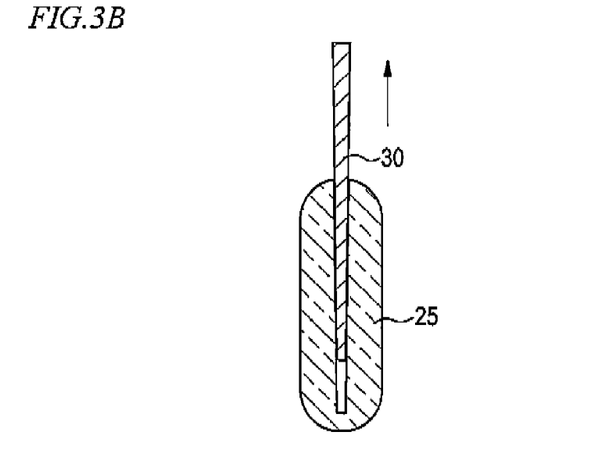
Figure 3C:
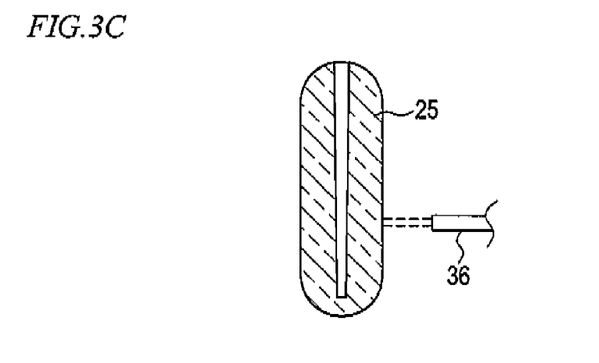

A preferred example of a manufacturing method for a tubular hydrogen separation material 20 described above, in a case where the porous support 21 comprises porous silica glass, includes a method of depositing porous silica glass to the periphery of a dummy rod (deposition step) and then drawing out the dummy rod (drawing out step). An embodiment of the method is to be described below with reference to FIGS. 3 A, 3B, and 3C.

FIG. 3 A is a view for explaining a deposition step according to this embodiment and FIG. 3B is a view for explaining a drawing out step according to the embodiment. In FIG. 3 A, a dummy rod 30 is disposed vertically with the top end being downside. Further, it may also be in a configuration disposed horizontally. As a material for the dummy rod 30, alumina, glass, refractory ceramics, carbon, etc. can be used. The dummy rod 30, after fixing, is rotated around a central axis as the center. Then, fine glass particles are deposited to the outer periphery of the dummy rod 30 by a burner 35 disposed on the side of the dummy rod 30 by an outside CVD method (OVD method). An element of rare earth elements, group 4B elements, Al, and Ga or two or more of them in combination can be added to the fine glass particles in accordance with the desired mechanical property and the steam durability. That is, according to the manufacturing method, the ingredients can be controlled easily.

Upon deposition of the fine glass particles, the burner 35 is traversed in the axial direction of the dummy rod 30 or the dummy rod 30 is traversed in the axial direction. The starting material supplied and the amount of supply can be made different on every traversing cycle. Thus, the fine glass particles deposited to the outer circumference of the dummy rod 30 have a predetermined bulk density and the distribution of the composition in the radial direction. Further, a tubular porous silica glass 25 closed at the top end is manufactured by depositing the fine glass particles also at the top end of the dummy rod 30.

The porous silica glass may be densified by sintering fine silica glass particles under heating after depositing the fine silica glass particles such that the porosity is within a range from 20 to 70%. Alternatively, the porosity may also be controlled by adjusting the temperature at which the fine silica glass particles is deposited. While the temperature of heat sintering after the deposition is not particularly restricted, it is preferably 1000° C. to 1400° C. If it is lower than 1000° C., sintering may not sometimes proceed sufficiently. On the other hand, if it exceeds 1400° C., the porosity may sometimes be decreased excessively. Further, also when the porosity is controlled depending on the deposition temperature, the temperature is not particularly restricted and, for example, it is preferably from 1400° C. to 1700° C. If it is lower than 1400° C., sintering of the fine silica glass particles may not sometimes be progressed sufficiently and if it exceeds 1700° C., the porosity becomes excessively small. The deposition temperature is more preferably from 1500° C. to 1600° C.

The drawing out step after the deposition step is described with reference to FIG. 3B. In FIG. 3B, the dummy rod 30 is drawn out from the porous silica glass 25. The central hole 23 formed by drawing out does not passing through but the lower end (top end) 23a is closed while being opened only at the upper end (refer to FIG. 2). For facilitating the drawing out, carbon or nitride, etc. is preferably coated previously to the surface of the dummy rod 30.

(2) Silica Glass Membrane Forming Step

After forming the porous support comprising porous silica glass, a silica glass membrane is formed to the surface of the porous support by a sol-gel method, a CVD method, a method of surface modifying the porous silica glass, etc. FIG. 30 is a view for explaining the silica glass membrane forming step according to the embodiment. A method of forming a silica glass membrane by surface modification of the surface of the porous silica glass by a surface processing apparatus is to be described.

The porous silica glass 25 obtained by the porous support step is modified at the surface by densifying the surface into a dense silica glass membrane 22 by a surface processing apparatus 36. Any surface processing device 36, for example, capable of irradiating an energy ray at a high temperature may be used and a $CO_2$ laser, a plasma arc, an oxyhydrogen burner, etc. may be used alone or in combination of plurality of them. The porous support 21 and the silica glass member 22 are formed by surface modification of the porous silica glass 25.

The extent of the surface modification for the silica glass membrane 22 is not particularly restricted so long as it is within a range that the silica glass membrane 22 functions as a hydrogen permeation membrane and the thickness is preferably from 0.01 to 50 μm, more preferably, from 0.02 to 10 μm and, further preferably, from 0.03 to 5 μm in view of the hydrogen molecule separatability. Further, the silica glass membrane 22 preferably has pores at a diameter of about 0.3 nm so as to allow only the hydrogen molecules to permeate therethrough.

While a drawing out step of drawing out only the dummy rod 30 from the porous silica glass 25 deposited to the periphery of the dummy rod 30 is performed before the silica glass membrane forming step, the silica glass membrane forming step may be conducted naturally also in a state where the porous silica glass 25 is deposited to the periphery of the dummy rod 30. After the silica glass membrane forming step, a tubular hydrogen separation material 20 can be formed by drawing out only the dummy rod 30.

(Hydrogen Separation Module)

Figure 4:
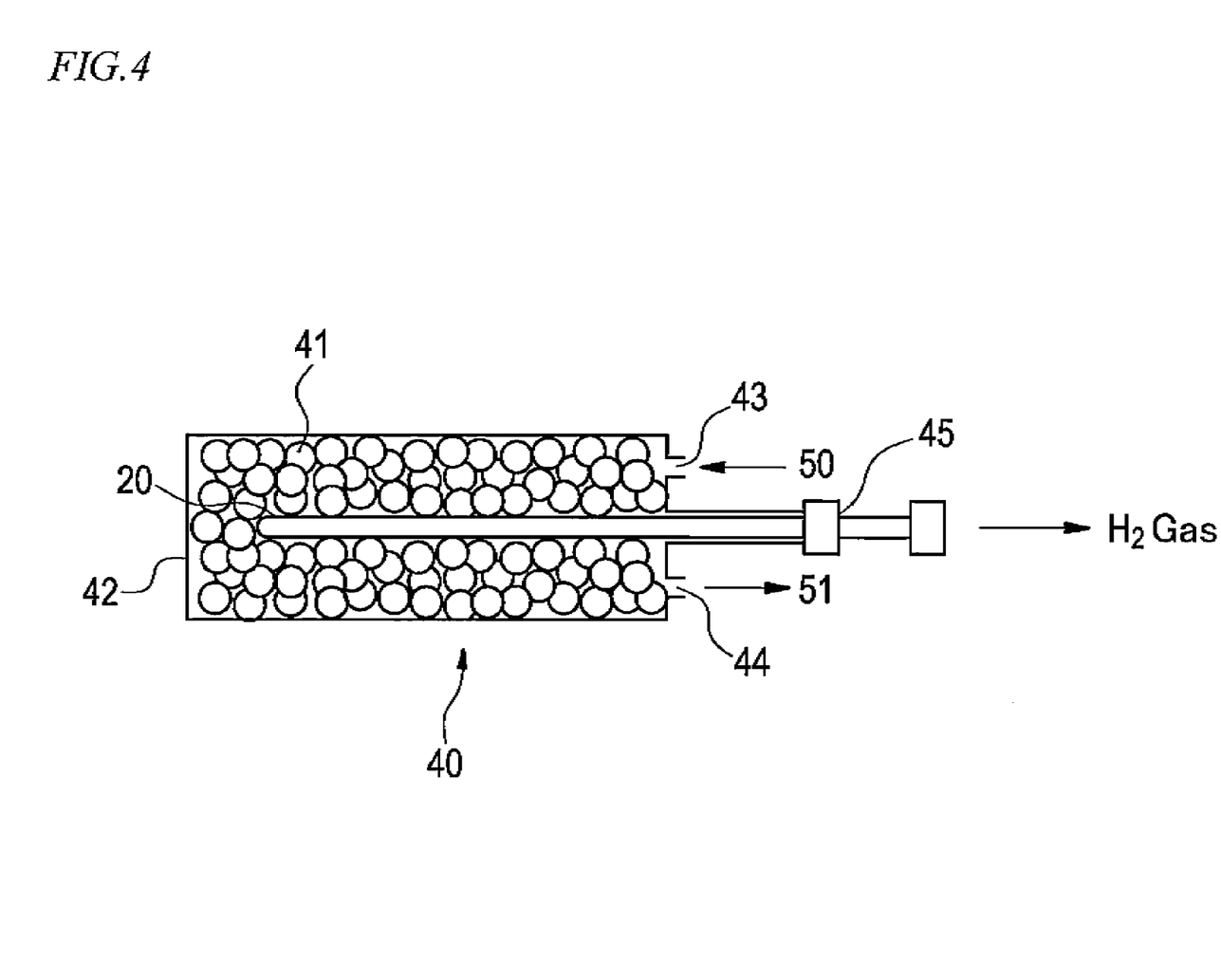
FIG. 4 is a view explaining a hydrogen separation module to which a hydrogen separation material 20 is applied.

The hydrogen separation module according to the invention comprises the hydrogen separation material of the invention and a steam reforming catalyst. An embodiment of the hydrogen separation module according to the invention is to be described with reference to FIG. 4. FIG. 4 is a view for explaining the hydrogen separation module to which the hydrogen separation material 20 is applied.

The hydrogen separation module 40 shown in FIG. 4 has a hydrogen separation material 20 and a steam reforming catalyst 41 in a reaction vessel 42. The reaction vessel 42 has an introduction port 43 for introducing a starting gas 50 into the reaction vessel 42, a discharge port 44 for discharging a discharge gas 51 from the reaction vessel 42, and a disposing port 45 for disposing the hydrogen separation material 20 into the reaction vessel 42. The steam reforming catalyst 41 is packed around the hydrogen separation material 20 in the reaction vessel 42.

The starting gas 50 is obtained by combustion of a fuel such as city gas, propane gas, kerosene, petroleum oil, biomethanol, natural gas, methane hydrate, etc. The starting gas 50 is heated to about 500° C. after being introduced into the reaction vessel 42 and reformed by the steam reforming catalyst 41 (for example, Ru type catalyst) to generate a hydrogen gas. During the reforming reaction, the generated hydrogen gas is selectively extracted by the tubular hydrogen separation material 20 and caused to permeate as far as the central hole 23 inside the tube and taken out of the reaction vessel 42. Accordingly, hydrogen generation is promoted in view of chemical equilibrium to attain lowering of reaction temperature. Since CO shifting reaction is taken place simultaneously, the CO shifting catalyst is theoretically unnecessary.

(Hydrogen Production Apparatus)

The hydrogen production apparatus according to the invention comprises a hydrogen separation module according to the invention. While it is considered that the hydrogen separated and formed by the hydrogen separation module according to the invention is at a high purity of 99% or higher, it is preferred to further include a CO removing module having a CO methanation catalyst, etc. for example, in a case of a hydrogen production apparatus used for stationary domestic fuel cells in order to further decrease the amount of intruded CO (preferably 10 ppm or less). While a CO selective oxidation catalyst may also be used instead of the CO methanation catalyst, this involves a drawback that oxygen or air has to be supplied between the hydrogen separation module and the CO removing module, the hydrogen concentration is lowered due to generation of water by the reaction of hydrogen and oxygen or intrusion of nitrogen. In a case of a hydrogen production apparatus used for automobile fuel cells, since highly pure hydrogen (99.99% or higher) at a further lower CO concentration (less than 1 ppm) is necessary, it is preferred to further include a hydrogen purifying module to which a pressure swing adsorption (PSA) method is applied.

An embodiment of the hydrogen production apparatus according to the invention is to be described with reference to FIGS. 5 and 6.

Figure 5:
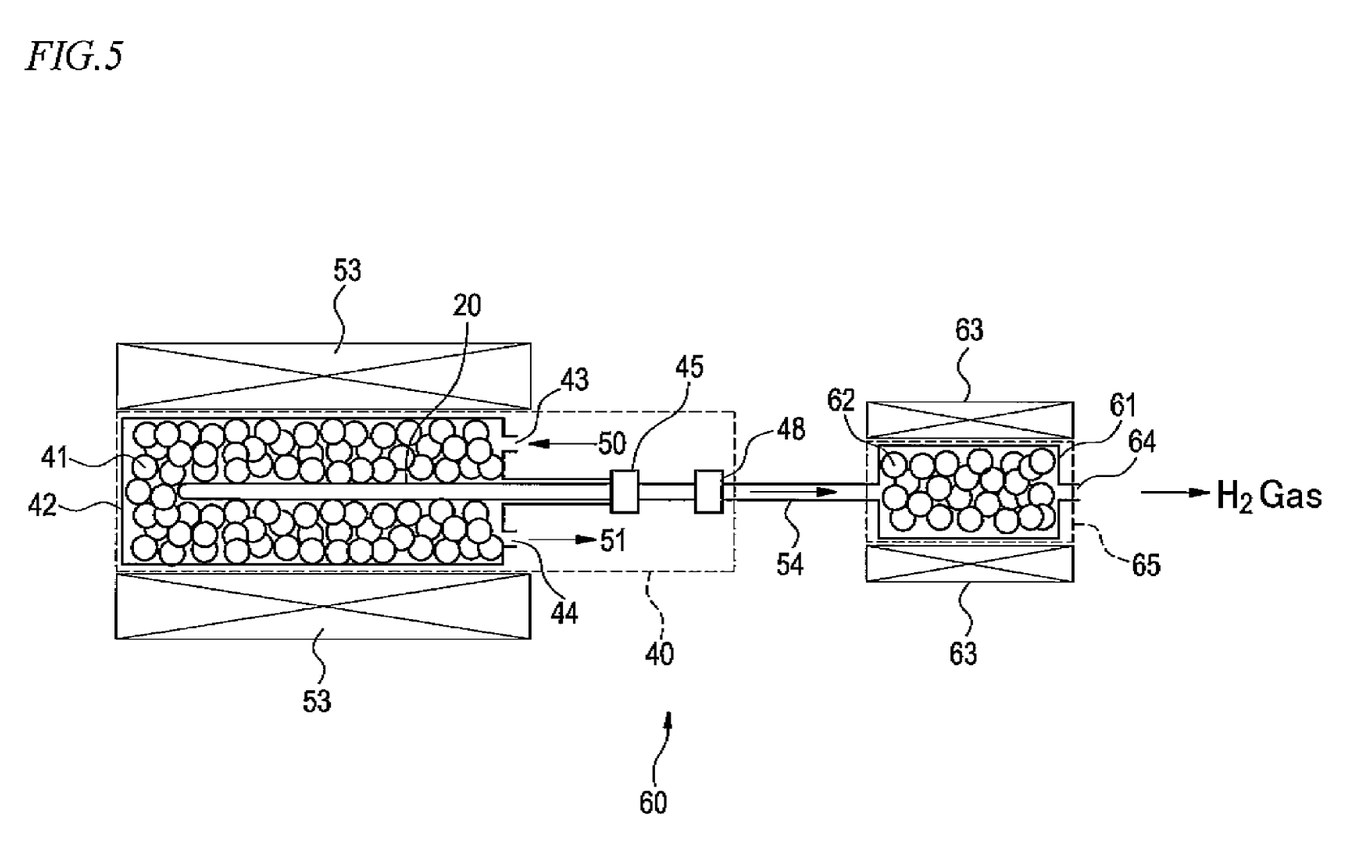
FIG. 5 is a view explaining an example of a hydrogen production apparatus to which a hydrogen separation module 40 is applied.

FIG. 5 is a view for explaining a hydrogen production apparatus comprising a hydrogen separation module 40 and a CO removing module having a CO methanation catalyst.

A hydrogen production apparatus 60 shown in FIG. 5 has a hydrogen separation module 40 and a CO removing module 65. The CO removing module 65 comprises a reaction vessel 61 for taking place a CO removing reaction and a CO methanation catalyst (for example, Ru type catalyst) 62 disposed at the inside thereof. Further, the hydrogen production apparatus 60 further has a heat generation body 53 for causing steam reforming reaction of the starting gas 50 near the hydrogen separation module 40, and a heat generation body 63 for causing CO removing reaction near the CO removing module 65. The CO removing module 65 is connected by way of a connection tube 54 using a connection joint 48 to the hydrogen separation module 40. The hydrogen gas generated from the hydrogeh separation module 40 is introduced through a connection tube 54 to the CO removing module 65 and put to CO removing reaction. The purified hydrogen gas is taken out of the discharge port 64.

Figure 6:
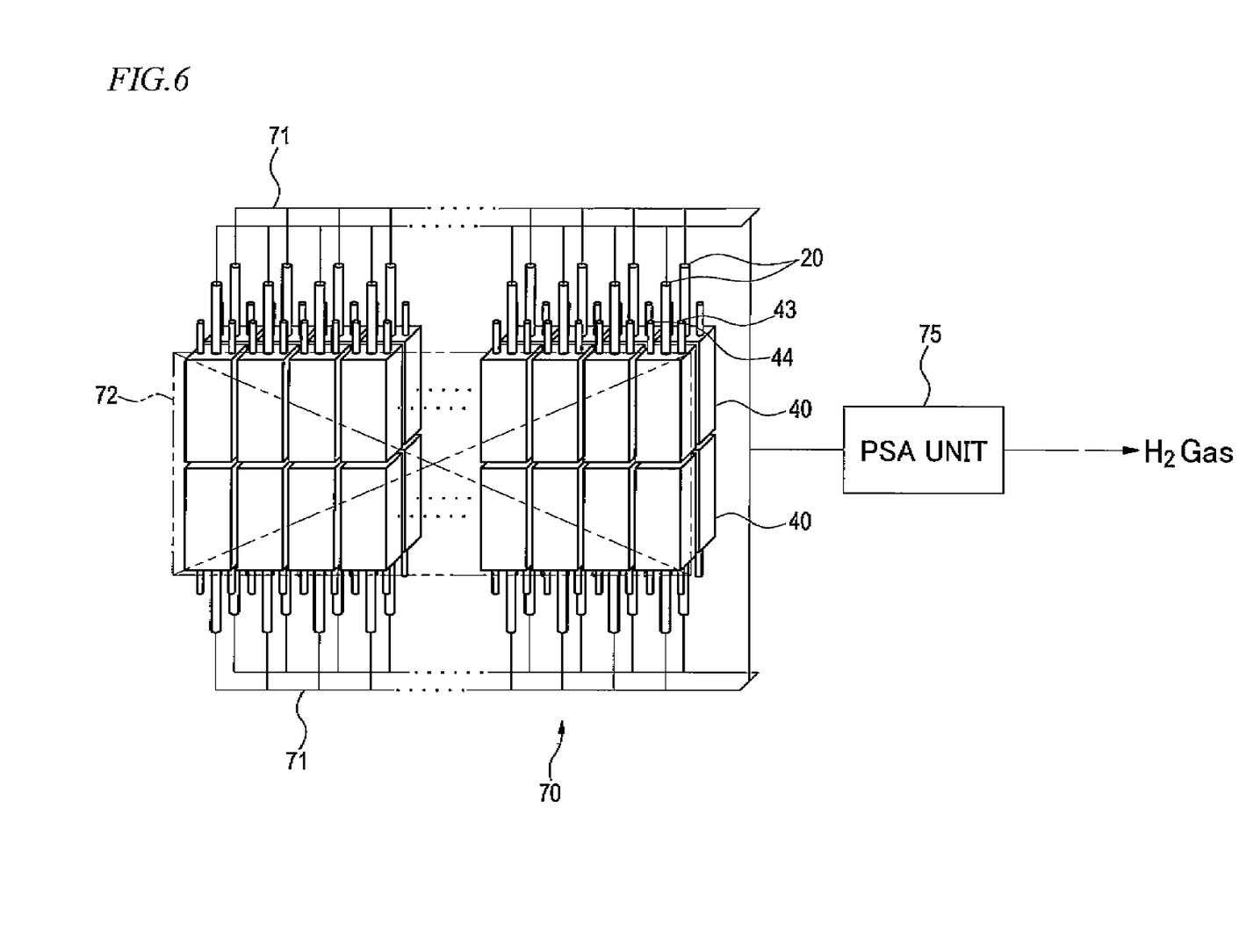
FIG. 6 is a view explaining another example of the hydrogen production apparatus to which the hydrogen separation module 40 is applied.

FIG. 6 is a view for explaining a hydrogen production apparatus having a hydrogen separation module 40 and a hydrogen purification module to which a pressure swing adsorption (PSA) method is applied.

A hydrogen production apparatus 70 shown in FIG. 6 comprises a plurality of hydrogen separation modules 40 and a hydrogen purifying module (PSA unit) 75 to which the PSA method is applied. Mach of the hydrogen separation modules 40 is connected at a hydrogen discharge portion (not illustrated) in the hydrogen separation material 20 by way of a connection tube 71 to the PSA unit 75. A panel-like heat generation body (shown by dotted line) 72 is disposed near the plurality of hydrogen separation modules 40 to take place steam reforming reaction. The generated hydrogen gas is introduced through the connection tube 71 to the PSA unit 75 and then a hydrogen gas at a high purity is produced by removing gas ingredients other than hydrogen.

EXAMPLE

The present invention is to be described more specifically with reference to embodiments according to the invention. The invention is not restricted to such examples.

Comparative Examples 1 to 2

A silica glass membrane of 50 nm thickness was formed to the surface of a support comprising a porous alumina or porous zirconia tube sealed at one end with an outer diameter of 10 mm, a thickness of 1 mm, and a length of 300 mm by using a sol-gel method. When the composite structures were heated in an electric furnace to 500° C. and rapidly dropped into water at 30° C. (water dropping test) for confirming the thermal shock resistance, the composite structural body was fractured.

Comparative Example 3

Porous glass with an outer diameter of 10 mm, a thickness of 1 mm, and a length of 30 mm sealed at one end was manufactured by depositing porous glass of a composition described in Table 1 (mol) to a carbon coated alumina tube sealed at one end by using an outside CVD method and drawing out a dummy rod therefrom. A silica glass membrane of 50 nm thickness was formed to the surface of the porous glass by using a sol-gel method. When the composite structural body was heated to 500° C. in an electric furnace and dropped rapidly into water at 30° C., while the composite structural body was not fractured but formation of cracks in the silica glass membrane was confirmed under electron microscopic observation.

Examples 1 to 3

A porous glass at an outer diameter of an 10 mm, a thickness of 1 mm and a length of 300 mm sealed at one end was manufacture by depositing a porous glass of a composition (mol %) described in Table 1 by using an outside CVD method to a carbon coated alumina tube sealed at one end and drawing out a dummy rod. A silica glass membrane of 50 nm thickness was formed to the surface of the porous glass by using a sol-gel method. When the composite structural bodies were heated to 500° C. in an electric furnace and dropped rapidly into water at 30° C., fracture of the composite structural body and formation of cracks in the silica glass membrane were not observed.

Then, the surface of the porous body was irradiated with a plasma arc to form a dense silica glass membrane of 20 μm thickness. A dummy rod was drawn out from the composite structural body to manufacture a tubular hydrogen separation material with an outer diameter of 10 mm, a thickness of 1 mm, a length of 300 mm, a porosity of 68%, and a linear thermal expansion coefficient of $0.7 \times 10^{-6}$/K. When a 50% $H_2$-50% $N_2$ gas at 0.2 MPaG was supplied to the outside of the hydrogen separation material, the hydrogen concentration in a gas at an atmospheric pressure permeating to the inside of

TABLE 1

| | | Comp. Example 1 | Comp. Example 2 | Comp. Example 3 | Example 1 | Example 2 | Example 3 |
|---|---|---|---|---|---|---|---|
| Porous support | Material | Alumina | Zirconia | $80SiO_2$—$20Al_2O_3$ glass | Silica glass | $90SiO_2$—$10Al_2O_3$ glass | $85SiO_2$—$15Al_2O_3$ glass |
| | Porosity (%) | 50 | 50 | 50 | 50 | 50 | 50 |
| | Outer diameter (mm) | 10 | 10 | 10 | 10 | 10 | 10 |
| | Thickness (mm) | 1 | 1 | 1 | 1 | 1 | 1 |
| | Thermal expansion coefficient ($\times 10^{-6}$/K) | 7.3 | 10.8 | 2.6 | 0.7 | 1.4 | 1.8 |
| Separation membrane | Material | Silica glass | Silica glass | Silica glass | Silica glass | Silica glass | Silica glass |
| | Thickness (mm) | 50 | 50 | 50 | 50 | 50 | 50 |
| | Film forming method | Sol-gel method | Sol-gel method | Sol-gel method | Sol-gel method | Sol-gel method | Sol-gel method |
| Water dropping test | | Support fractured | Support fractured | Separation membrane fractured | No change | No change | No change |

It is apparent from the result described above that a hydrogen separation material of excellent thermal shock resistance can be obtained by setting the thermal expansion coefficient of the porous support to $2 \times 10^{-6}$/K or less.

Example 4

Porous silica glass was deposited to a carbon coat alumina tube sealed at one end by using an outside CVD method. Then, the surface of the porous silica glass was irradiated with a $CO_2$ laser to form a dense silica glass membrane of 1 μm thickness. A dummy rod was drawn out from the composite structural body to manufacture a tubular hydrogen separation material with an outer diameter of 16 mm, a thickness of 1.5 mm and a length of 300 mm, a porosity of 40%, and a linear thermal expansion coefficient of $0.7 \times 10^{-6}$/K. When a 50% $H_2$-50% $N_2$ gas at 0.2 MPaG was supplied to the outside of the hydrogen separation material, the hydrogen concentration in a gas at an atmospheric pressure permeating to the inside of the hydrogen separation material was 99% or higher and the hydrogen permeation coefficient at 550° C. was $4 \times 10^{-7}$ $mol \cdot m^{-2} \cdot s^{-1} \cdot Pa^{-1}$. Further, after exposing the outside of the hydrogen separation material to steams at 0.2 MPaG and 600° C. for 120 hours, when the surface was observed under an electron microscope, defects such as cracks were not observed while a denatured layer of extremely small area was recognized.

Example 5

Porous silica glass was deposited to a carbon coated alumina tube sealed at one end by using an outside CVD method.

the hydrogen separation material was 99% or higher and the hydrogen permeation coefficient at 550° C. was $0.3 \times 10^{-7}$ $mol \cdot m^{-2} \cdot s^{-1} \cdot Pa^{-1}$.

Example 6

Porous silica glass was deposited to a carbon coated alumina tube sealed at one end by using an outside CVD method. Then, an oxyhydrogen burner flame was applied to the surface of the porous body to form a dense silica glass membrane of 40 μm thickness. A dummy rod was drawn out from the composite structural body to manufacture a tubular hydrogen separation material with an outer diameter of 16 mm, a thickness of 4 mm, a length of 300 mm, a porosity of 22%, and a linear thermal expansion coefficient of $0.7 \times 10^{-6}$/K. When a 50% $H_2$-50% $N_2$ gas at 0.2 MPaG was supplied to the outside of the hydrogen separation material, the hydrogen concentration in a gas at an atmospheric pressure permeating to the inside of the hydrogen separation material was 99% or higher and the hydrogen permeation coefficient at 550° C. was $0.05 \times 10^{-7}$ $mol \cdot m^{-2} \cdot s^{-1} \cdot Pa^{-1}$.

Examples 7 to 10

Four types of porous silica glass with addition of 1000 ppm of Y, Al, Ti, Ga were deposited respectively to carbon coated alumina tubes sealed at one end by using an outside CVD method. Then, the surface of each porous body was irradiated with a $CO_2$ laser to form a dense silica glass membrane of 3 μm thickness. A dummy rod was drawn out from the composite structural body to manufacture a tubular hydrogen separation material with an outer diameter of 16 mm, a thickness of 1.5 mm, a length of 300 mm, a porosity of 40%, and a linear thermal expansion coefficient of $0.7 \times 10^{-6}$/K. When a 50% $H_2$-50% $N_2$ gas at 0.2 MPaG was supplied to the outside of the hydrogen separation material, the hydrogen concentration in a gas at an atmospheric pressure permeating to the inside of the hydrogen separation material was 99% or higher and the hydrogen permeation coefficient at 550° C. was $1 \times 10^{-7}$ mol·m$^{-2}$·s$^{-1}$·Pa$^{-1}$ in each of the cases Further, after exposing the outside of the tubular hydrogen separation material to steams at 0.2 MPaG, and at 600° C. for 120 hours, when the surface was observed under an electron microscope, detects such as denatured layer or cracking were not observed.

Example 11

As shown in FIG. 5, a starting gas comprising $H_2O/CH_4=3$ was supplied to a reaction vessel of a hydrogen separation module having the tubular hydrogen separation material of Example 9 and a commercial Ru type reforming catalyst was supplied to take place hydrogen reforming at a temperature of 550° C. and a pressure of 0.5 MPaG. The hydrogen concentration in a gas permeating to the inside of the tubular hydrogen separation material was 99% or higher, the carbon monoxide concentration was about at 500 ppm, and the hydrogen production rate was 0.02 Nm$^3$/h. Further, the carbon monoxide concentration after passing the gas through a CO removing module having a commercial Ru type Co methanation catalyst was 10 ppm or less.

Example 12

52 sets of hydrogen separation modules each comprising the tubular hydrogen separation material of Example 9 and the commercial Ru type reforming catalyst were connected as shown in FIG. 6. A starting gas comprising $H_2O/CH_4=3$ was supplied to the reaction vessels of the entire modules and steam reforming was performed at a temperature of 550° C. and a pressure of 0.5 MPaG. The hydrogen concentration was 99% or higher and the carbon monoxide concentration was about 500 ppm in a gas permeating to the inside of the hydrogen separation material, and the hydrogen production rate was 1 Nm$^3$/h. Further, the hydrogen concentration of the gas was 99.99% or higher and the carbon monoxide concentration was 1 ppm or less after purification by using a commercial PSA type hydrogen purifier.

Table 2 shows characteristics, etc. of the Examples 4 to 12 described above.

TABLE 2

| | Characteristic | Example 4 | Example 5 | Example 6 | Example 7 | Example 8 |
|---|---|---|---|---|---|---|
| Support portion | Material (with addition of element) | Silica glass | Silica glass | Silica glass | Silica glass (Y: 1000 ppm) | Silica glass (Ti: 1000 ppm) |
| | Manufacturing method | Outside CVD method + dummy rod drawing out | Outside CVD method + dummy rod drawing out | Outside CVD method + dummy rod drawing out | Outside CVD method + dummy rod drawing out | Outside CVD method + dummy rod drawing out |
| | Thickness (mm) | 1.5 | 1 | 4 | 1.5 | 1.5 |
| | Outer diameter(mm) | 16 | 10 | 16 | 16 | 16 |
| | Length (mm) | 300 | 300 | 300 | 300 | 300 |
| | Linear thermal expansion coefficient ($10^{-6}$/K) | 0.7 | 0.7 | 0.7 | 0.7 | 0.7 |
| | Porosity (%) | 40 | 68 | 22 | 40 | 40 |
| Membrane portion | Film forming method | Surface modification ($CO_2$ laser) | Surface modification (plasma arc) | Surface modification (Oxyhydrogen burner) | Surface modification ($CO_2$ laser) | Surface modification ($CO_2$ laser) |
| | Thickness (μm) | 1 | 20 | 40 | 3 | 3 |
| Hydrogen separation characteristic | $H_2$ concentration (%) | 99 or higher | 99 or higher | 99 or higher | 99 or higher | 99 or higher |
| | $H_2$ permeation coefficient ($10^{-7}$ mol·m$^{-2}$·s$^{-1}$·Pa$^{-1}$) | 4 | 0.3 | 0.05 | 1 | 1 |
| Steam durability | Membrane portion surface state | Partially modified | — | — | good | good |
| Reforming characteristics | Hydrogen concentration(%) | — | — | — | — | — |
| | Hydrogen manufacturing rate (Nm$^3$/h) | — | — | — | — | — |
| | CO removing method | — | — | — | — | — |
| | CO concentration (ppm) | — | — | — | — | — |

| | Characteristic | Example 9 | Example 10 | Example 11 | Example 12 |
|---|---|---|---|---|---|
| Support portion | Material (with addition of element) | Silica glass (Al: 1000-ppm) | Silica glass (Ga: 1000 ppm) | Silica glass (Al: 1000 ppm) | Silica glass (Al: 1000 ppm) |
| | Manufacturing method | Outside CVD method + dummy rod drawing out | Outside CVD method + dummy rod drawing out | Outside CVD method + dummy rod drawing out | Outside CVD method + dummy rod drawing out |
| | Thickness (mm) | 1.5 | 1.5 | 1.5 | 1.5 |

TABLE 2-continued

|  |  | | | | |
|---|---|---|---|---|---|
| | Outer diameter(mm) | 16 | 16 | 16 | 16 |
| | Length (mm) | 300 | 300 | 300 | 300 |
| | Linear thermal expansion coefficient ($10^{-6}$/K) | 0.7 | 0.7 | 0.7 | 0.7 |
| | Porosity (%) | 40 | 40 | 40 | 40 |
| Membrane portion | Film forming method | Surface modification ($CO_2$ laser) | Surface modification ($CO_2$ laser) | Surface modification ($CO_2$ laser) | Surface modification ($CO_2$ laser) |
| | Thickness (μm) | 3 | 3 | 3 | 3 |
| Hydrogen separation characteristic | $H_2$ concentration (%) | 99 or higher | 99 or higher | 99 or higher | 99 or higher |
| | $H_2$ permeation coefficient ($10^{-7}$ mol·$m^{-2}$·$s^{-1}$·$Pa^{-1}$) | 1 | 1 | 1 | 1 |
| Steam durability | Membrane portion surface state | good | good | good | good |
| Reforming characteristics | Hydrogen concentration(%) | — | — | 99 or higher | 99.99 or higher |
| | Hydrogen manufacturing rate ($Nm^3$/h) | — | — | 0.02 | 1 |
| | CO removing method | — | — | CO methanation catalyst | PSA |
| | CO concentration (ppm) | — | — | <10 | <1 |

*: "—" in the table shows that measurement was not conducted.

As can be seen from the table, a hydrogen separation material more excellent in the thermal shock resistance can be obtained by forming a porous support with a material of an identical quality and having a thermal expansion coefficient of $2\times10^{-6}$/K or less and a thermal expansion coefficient approximate to that of the silica glass membrane. Particularly, according to the method of modifying the surface of the porous silica glass into a silica glass membrane, a hydrogen separation material of high bonding strength between the membrane and the support can be formed, and the thickness and the size of the pores of the silica glass membrane can be controlled simply depending on the extent of modification (densification).

REFERENCE SIGNS LIST 10, 20 - - - hydrogen separation material, 11, 21 - - - porous support, 12, 22 - - - silica glass membrane, 23 - - - central hole, 23a - - - top end of the central hole, 25 - - - porous silica glass, 30 - - - dummy rod, 35 - - - burner, 36 - - - surface processing device, 40 - - - hydrogen separation module, 41 - - - hydrogen reforming catalyst, 42, 61 - - - reaction vessel, 43 - - - introduction port, 44, 64 - - - discharge port, 45 - - - disposing port, 48 - - - connection joint, 50 - - - starting gas, 51 - - - discharge gas, 53, 63, 72 - - - heat generation body, 54, 71 - - - connection tube, 60, 70 - - - hydrogen production apparatus, 62 - - - CO methanation catalyst, 65 - - - CO removing module, 75 - - - hydrogen purifying module (PSA unit), T - - - outer diameter, P - - - inner diameter, L - - - length While the present invention has been described specifically with reference to specific embodiments, it will be apparent to a person skilled in the art that various changes and modifications are possible without departing the gist of the spirit and the scope of the invention.

The present application is based on the Japanese Patent Application filed on Dec. 11, 2009 (Japanese Patent Application No. 2009-282210), and the whole portion thereof is incorporated by reference. Further, all, of the references cited herein is taken in its entirety.

The invention claimed is:

1. A method of manufacturing a hydrogen separation material including:
    a porous support forming step of depositing porous silica glass to the periphery of a dummy rod and then drawing out the dummy rod to form a tubular porous support comprising the porous silica glass; and
    a silica glass membrane forming step of forming a silica glass membrane on the surface of the porous silica glass,
    wherein the silica glass membrane forming step comprises densifying the surface of the porous silica glass thereby forming a dense silica glass membrane, and
    wherein the silica glass membrane comprises irradiating with at least one selected from: a $CO_2$ laser, a plasma arc, and an oxyhydrogen burner, thereby densifying the surface of the porous silica glass.

2. A method of manufacturing a hydrogen separation material including:
    a porous support forming step of depositing porous silica glass to the periphery of a dummy rod and then drawing out the dummy rod to form a tubular porous support comprising the porous silica glass; and
    a silica glass membrane forming step of forming a silica glass membrane on the surface of the porous silica glass,
    wherein the porous support forming step comprises:
        forming the tubular porous support so as to be sealed at one end of the tubular porous support,
    wherein the silica glass membrane forming step comprises:
        forming the silica glass membrane on the surface of the porous silica glass including the one end of the tubular porous support,
    the tubular support is formed so as to be sealed at one end by drawing out the dummy rod.

3. A method of manufacturing a hydrogen separation material including:
    a porous support forming step of depositing porous silica glass to the periphery of a dummy rod and then drawing out the dummy rod to form a tubular porous support comprising the porous silica glass; and
    a silica glass membrane forming step of forming a silica glass membrane on the surface of the porous silica glass, wherein the porous support forming step comprises:
    forming the tubular porous support so as to be sealed at one end of the tubular porous support,
wherein the silica glass membrane forming step comprises:
    irradiating with at least one selected from: a $CO_2$ laser, a plasma arc, and an oxyhydrogen burner, thereby densifying the surface of the porous silica glass.

* * * * *